United States Patent [19]

Billings

[11] 3,879,652

[45] Apr. 22, 1975

[54] AC SOLID STATE POWER CONTROLLER WITH MINIMIZED INTERNAL POWER SUPPLY REQUIREMENTS

[75] Inventor: William W. Billings, Lima, Ohio

[73] Assignee: Westinghouse Electric Corporation, Pittsburgh, Pa.

[22] Filed: Aug. 13, 1973

[21] Appl. No.: 387,991

[52] U.S. Cl....... 323/22 SC; 307/252 UA; 307/297; 321/11; 323/38
[51] Int. Cl. .............................................. G05f 1/56
[58] Field of Search........ 307/252 Q, 252 UA, 296, 307/297; 323/18, 24, 22 SC, 22 T, 9, 34–38; 321/15, 11, 14

[56] References Cited
UNITED STATES PATENTS

| | | | |
|---|---|---|---|
| 3,477,011 | 11/1969 | Westwood | 321/15 |
| 3,506,852 | 4/1970 | De Hart | 307/252 Q |
| 3,513,376 | 5/1970 | Hajek | 321/15 |
| 3,577,177 | 5/1971 | Hewlett, Jr. | 323/18 |
| 3,602,795 | 8/1971 | Gunn | 321/15 |

Primary Examiner—Gerald Goldberg
Attorney, Agent, or Firm—G. H. Telfer

[57] ABSTRACT

A power controller having a switch whose drive circuit is supplied by a power supply producing DC power and whose control and protection circuits, such as an overcurrent protection circuit, a zero crossover detection circuit, and a control logic circuit, are operative without energization from a separate DC supply. Rather these circuits are powered merely from the AC line and the same DC supply as for the drive circuit. This minimizes requirements of the controller's internal power supply which may be met by a single transformer secondary winding or, preferably, a transformerless configuration such as a capacitor voltage divider power supply.

6 Claims, 3 Drawing Figures

AC SOLID STATE POWER CONTROLLER WITH MINIMIZED INTERNAL POWER SUPPLY REQUIREMENTS

CROSS REFERENCES

This application is filed together with, and is related in subject matter to, the following commonly assigned applications of even date with the present application:

Ser. No. 387,992 by W. W. Billings and L. L. Tipton and entitled "Zero Crossover Circuit;" and Ser. No. 387,993 by J. T. Mitchell and W. W. Billings and entitled "Overcurrent Protection Circuit for AC Systems."

Reference is also made to the following previously filed and copending application, assigned to the present assignee, that contains additional related subject matter:

Ser. No. 337,969, Filed Mar. 5, 1973, by K. C. Shuey and D. E. Baker and entitled "Alternating Current Sensing Circuit and Method", now U.S. Pat No. 3,811,073, issued May 14, 1974.

BACKGROUND OF THE INVENTION

This invention relates to power controllers for controlling the supply of power from an AC supply to a load and particularly to such power controllers suitable to applications in which size and weight must be minimized and comprising solid state rather than electromechanical components.

There are recognized advantages to replacing electromechanical relays and thermal overload devices with solid state power controllers for switching and protection functions in electrical distribution systems. Certain applications for such power controllers, such as in aircraft systems, have been impeded because of the complex circuitry designed to perform the required functions and the attendant cost, size, weight, heat dissipation, and unreliability inherent in circuits of the complexity proposed.

Prior AC solid state controllers have been characterized by requiring multiple internal power supplies for developing DC power from the AC line voltage. Typically, three isolated DC supplies are required and they may require separate regulation. Separate conductors are therefore required for supplying various ones of the internal circuit portions in a plurality of separate branch circuits. Shuey et al. U.S. Pat. No. 3,811,073, while not primarily directed to power supply requirements, does show a power controller of the same general type as that to which this application relates. Another source of useful background information on such power controllers is:

NAECON Proceedings, May 1971, a paper by D. E. Baker entitled "Power Controllers for Automatically Controlled Electrical Systems."

In a typical example of a solid state power controller in accordance with the type of prior art referred to, and which is presented for illustrative purposes in FIG. 1 of this application, the following internal power supply requirements are present: The circuit portion labeled "Power Supply" takes AC power from line 10 and develops DC on three separate, isolated buses. Those include a first DC bus 12 from the Power Supply to a "Drive Circuit" for driving the "Solid State Switch". A second DC bus 14 is provided between the Power Supply and Drive Circuit (past drive circuits for solid state switches of two inverse parallel thyristors have typically required two isolated supplies) and also powers an "Overcurrent Protection" circuit, a "Zero Crossover" circuit, and a "Control Logic" circuit. A third DC bus 16 is provided between the Power Supply and a "DC Control Circuit". For the required electrical isolation, each DC bus 12, 14, and 16 requires separate power supply components. Normally this includes a separate secondary winding for each on an AC transformer whose primary is connected to the line and also a separate rectifier and filter and regulating components.

The requirement for multiple power supplies means at the least a costly, complex power transformer that presents additional handling problems in manufacture. With the power transformer are required extra rectifying units and filters requisite for each of the individual supplies. Furthermore the development of various DC supply circuits from a single power transformer incurs some interaction between circuits that can impair performance and reliability, even though the DC supplies are nominally isolated.

SUMMARY OF THE INVENTION

The present invention came about from an effort to develop a power controller whose internal power supply requirements are minimized as compared with those of the prior art.

In accordance with this invention, an AC solid state power controller is provided having a switch whose drive circuit is supplied by a single power supply producing DC power and whose control and protection circuits, such as an overcurrent protection circuit, a zero crossover detection circuit, and a control logic circuit, are operative without energization from a separate DC supply but rather are powered merely from the AC line and the same DC supply as for the drive circuit. The DC control circuit requires no separate supply internal to the power controller but rather is energized solely by the applied control input signal.

These features minimize requirements of the controller's internal power supply which may be met by a transformer having a single secondary winding or, preferably, a transformerless configuration such as a capacitor voltage divider power supply.

The implementation of the present invention requires the various individual circuit portions that previously required separate DC supplies be made essentially "self-energized." By self-energized is meant they develop their own power from the AC line, or from the same DC bus that powers the drive circuit, or in the case of the DC control circuit, from another available DC voltage. By so arranging the system, there need be no separate DC power supply to the DC control circuit for energizing the system or the overcurrent protection system or the zero crossover circuit. Consequently, only a single DC supply voltage is required for all internal functions in the power controller. As a result, therefore, the invention minimizes the amount of required components and their cost and size and further enhances the reliability of the power controller.

DESCRIPTION OF THE PREFERRED EMBODIMENTS

Figure 2:
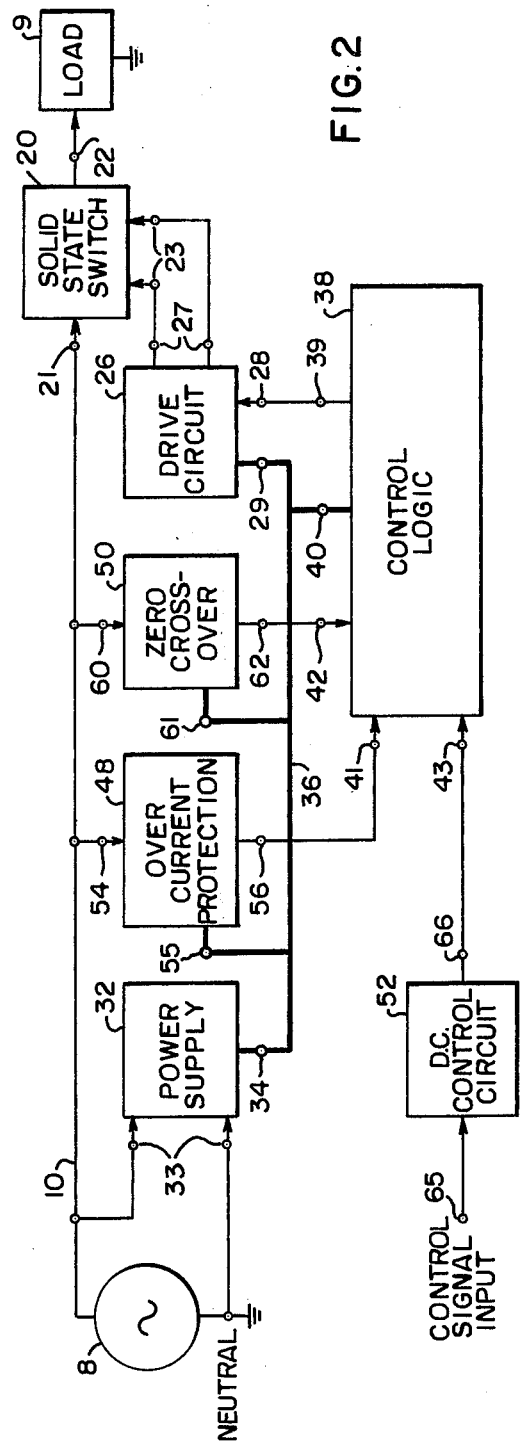
FIG. 2 is a schematic circuit diagram of an AC solid state power controller in accordance with the present invention.

Referring to FIG. 2, a solid state power controller is illustrated in a one-line diagram, for controlling the supply of power from an AC supply 8 to a load 9 on AC line 10. The power controller includes a switch 20 having supply and load terminals 21 and 22 connected respectively to the supply 8 and load 9 and also has at least one, in this case two, drive terminals 23 for the selective application of predetermined drive signals to alter the conduction state of the switch 20. While various switch configurations may be employed, of primary present interest in the practice of the present invention is a switch principally comprising a pair of inverse parallel thyristors.

A drive circuit 26 is provided for applying drive signals to the switch 20 and has at least one, in this example two, output terminals 27 electrically coupled respectively to the drive terminals 23 of the switch. The drive circuit 26 has a control input terminal 28 for receiving control signals to which it responds as well as a power interminal 29.

A power supply circuit 32 is provided that has input terminals 33 for connection to the AC supply and a reference potential (ground or neutral) and an output terminal 34 connected to the power input terminal of the drive circuit by DC bus 36. The power supply circuit 32 comprises elements for the conversion of AC power to DC power, with whatever filtering and regulation is desirable for the output power on bus 36.

A control logic circuit 38 is provided that has an output terminal 39 connected to the control input terminal 28 of the drive circuit 26 and a power input terminal 40 connected to the output terminal of the power supply circuit by DC bus 36. Circuit 38 also has signal input terminals 41, 42, and 43.

A plurality of additional circuits are provided for the purpose of introducing signals to the control logic circuit 38 for taking into account various circuit conditions or inputs to ultimately control the switching of the power switch 20. In the typical example illustrated there are an overcurrent protection circuit 48, a zero crossover circuit 50, and a DC control circuit 52 connected, respectively, to input terminals 41, 42, and 43 of control logic circuit 38.

The overcurrent protection circuit 48 is for the purpose of providing signals ultimately to control the conduction of the switch 20 so the load is not subjected to a damaging overcurrent. The zero crossover circuit 50 is to provide signals ultimately to control the conduction of the switch 20 in desired relation to zero crossovers of the waveform of the AC supply voltage as is required in the case of thyristor switches. The DC control circuit 52 is for the purpose of introducing to the control logic circuit 38 an input signal upon the occurrence of an external stimulus such as the manual closing of a switch by push button or the like to set the power controller into operation initially. These three circuit portions 48, 50 and 52 are examples of what will occassionally be referred to herein as "at least one control and protection circuit."

Overcurrent protection circuit 48 has an AC power input terminal 54 connected to the AC line 10 and a DC power input terminal 55 connected to bus 36. It also has an output terminal 56 connected to input terminal 41 of circuit 38.

Zero crossover circuit 50 has an AC power input terminal 60 connected to the AC line 10 and a DC power input terminal 61 connected to bus 36. It also has an output terminal 62 connected to input terminal 42 of circuit 38.

DC control circuit 52 requires no AC supply or connection to DC bus 36. It has an input terminal 65 for receiving a DC control signal from another part of the electrical system with which the power controller is used. It also has an output terminal 66 connected to input terminal 43 of circuit 38.

The control logic circuit 38 normally would have additional outputs, beside that shown to the drive circuit 26, for the purpose of indicating certain conditions of the power controller. For example there is usually a trip indicator output terminal and a status indicator output terminal for connection to some indicators such as lamps for the purpose of showing occurrence of a trip of the switch 20 as well as the on or off status of the switch. These circuit portions are not shown as they may be provided as has been previously done and do not affect power supply requirements.

Figure 1:
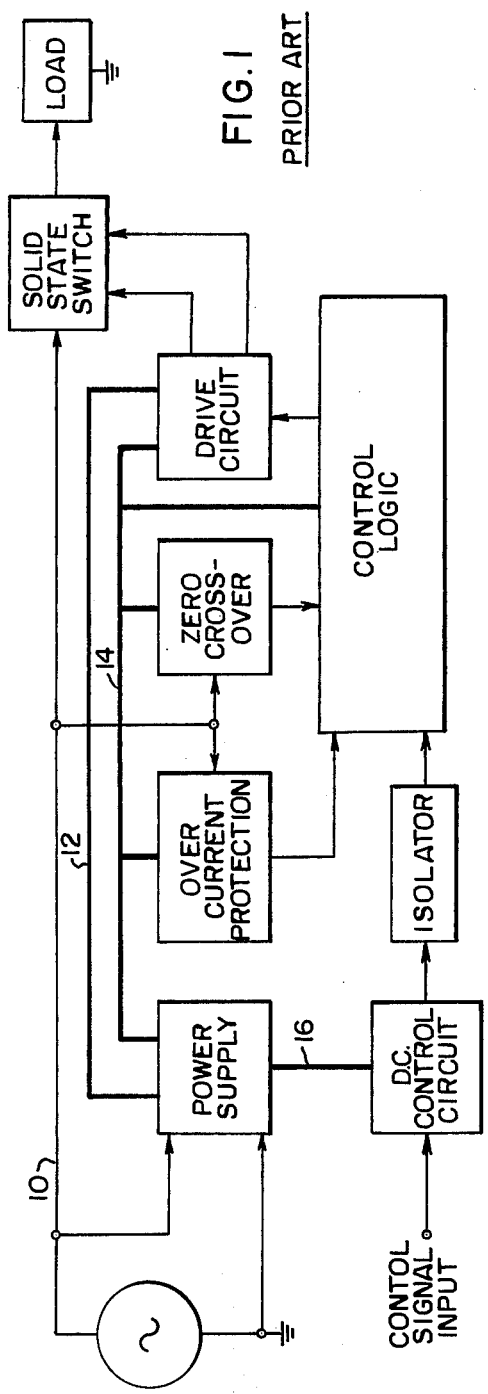
FIG. 1 is a schematic circuit diagram of an AC solid state power controller in accordance with the prior art as has been previously described.
Figure 3:
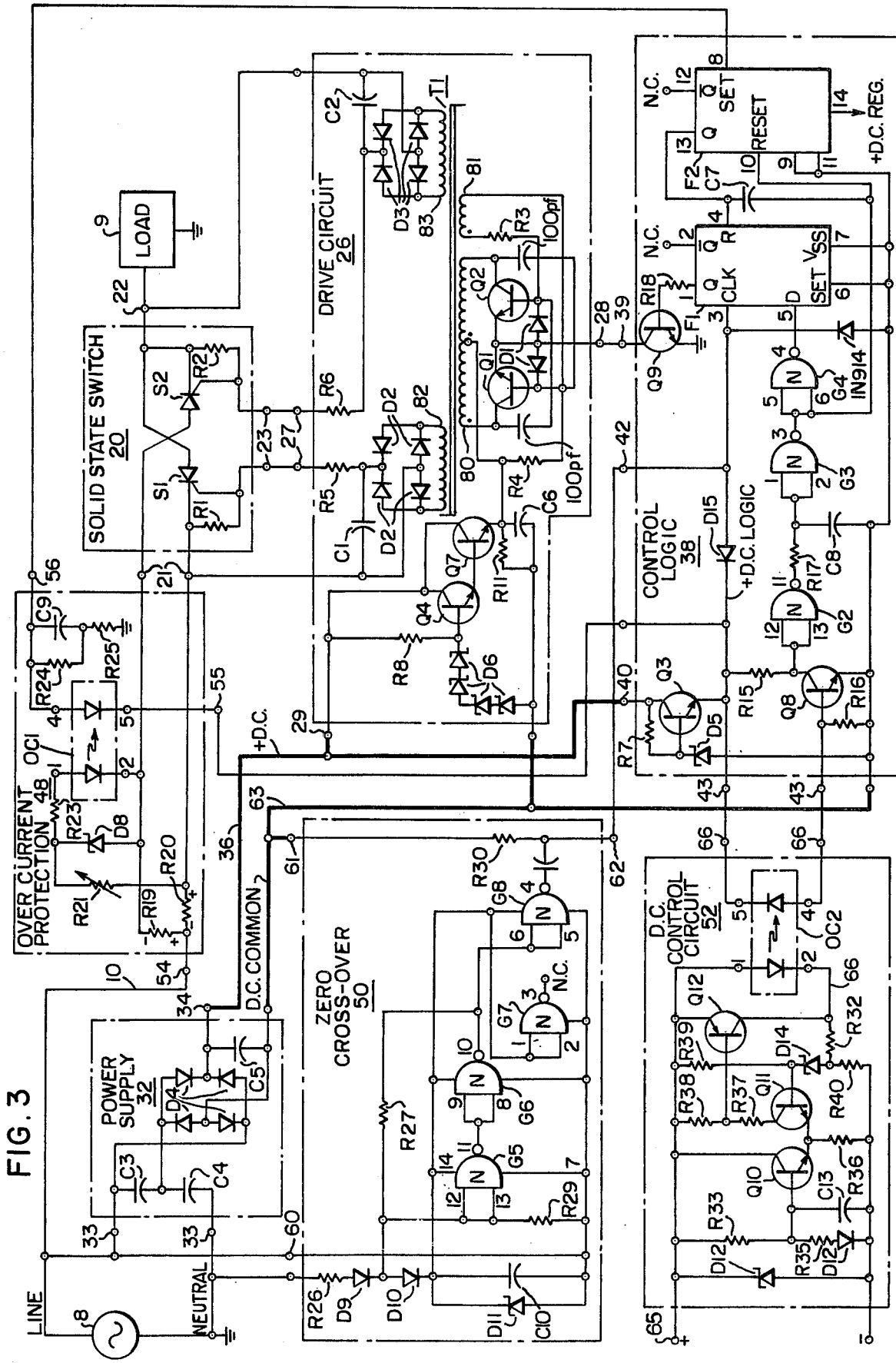
FIG. 3 is a circuit schematic of a more detailed example of an embodiment of the present invention.

Referring to FIG. 3, there is shown a detailed circuit schematic, by way of further example, of an embodiment of the present invention with the circuit portions boxed and identified by reference numerals corresponding to those of FIG. 1. It is believed that in principal part the manner of operation of the various circuit portions will be apparent to those skilled in the art. The following tabulation sets forth specific component identification that has been found suitable in successful operation of one form of the illustrated circuit.

| | |
|---|---|
| A.C. Supply 8 | 400 Hz., 230 V. rms. |
| Solid State Switch 20 | |
| Thyristors S1 and S2 | Type 2N690 |
| Resistors R1 and R2 | 500 ohms |
| (Circuit 20 can be generally characterized as comprising a pair of thyristors in inverse parallel connection.) | |
| Drive Circuit 26 | |
| Transformer T1 core | Saturable, Magnetics Inc. Type 80613-½D material |
| Winding 80 | 100 turns on each side of center tap |
| Winding 81 | 15 turns |
| Windings 82 and 83 | 25 turns |
| Transistors Q1 and Q2 | 2N5551 |
| Diodes D1 (two in number) D2 (four) and D3 (four) | 1N914 |
| Resistor R3 | 1,000 ohms |
| Resistor R4 | 100,000 ohms |
| resistor R5 and R6 | 82 ohms, positive temperature coefficient |
| Capacitors C1 and C2 | 0.01 mf. |
| (Circuit 26 can be generally characterized as comprising a free-running core timed oscillator.) | |

The following elements shown in circuit portion 26 are to set the DC voltage level for the drive circuit from DC bus 36:

| | |
|---|---|
| Transistor Q4 | 2N551 |
| Transistor Q7 | MMCS 3498 |
| Resistor R8 | 20,000 ohms |
| Diodes D6(4) | 5.6 v. Zeners |
| Capacitor C6 | 0.47 mf., 50 v. |
| Resistor R11 | 200,000 ohms |
| Power Supply Circuit 32 | |
| Capacitor C3 | 0.39 mf., 100 v. |

-Continued

| | |
|---|---|
| Capacitor C4 | 0.10 mf 600 v. |
| Diodes D4 (four) | 1N486A |
| Capacitor C5 | 10 mf. 75 v. |

(This circuit can be generally characterized as a capacitor voltage divider (C3 and C4) power supply 30 v. DC, nominal, is supplied at terminal 34 on power bus 36. Bus 63 is the DC return or common bus.)

Control Logic Circuit 38

| | |
|---|---|
| Logic Gates G2, G3 and G4 | CMOS type RCA/CD4011 Quad NAND |
| Resistor R15 | 25,000 ohms |
| Resistor R16 | 500,000 ohms |
| Diode D15 | 1N914 |
| Transistors Q8 and Q9 | 2N2219A |
| Resistor R17 | 1 Megohm |
| Capacitor C8 | 0.01mf |
| Resistor R18 | 2,500 ohms |
| Flip-Flops F1 and F2 | CD4013A, dual device |
| Capacitor C7 | 0.001 mf |

(This circuit may be generally characterized as comprising logic gates G2, G3 and G4 responsive to various inputs from the circuits 48, 50 and 52 to determine that state changing signals are applied to the drive circuit 26 at the desired times.)

The following elements shown in circuit portion 38 are to set the DC voltage level for the control logic circuit from DC bus 36:

| | |
|---|---|
| Diode D5 | 7.6 v. Zener |
| Resistor R7 | 20,000 ohms |
| Transistor Q3 | 2N551 |

Overcurrent Protection Circuit 48

| | |
|---|---|
| Resistors R19 and R20 | 0.5 ohm |
| Resistors R21 | 110–180 ohms variable |
| Diode D8 | 2.7 v. Zener |
| Resistor R23 | 8 ohms |
| Optically Coupled Diode Unit OC1 | Monsanto type MCD2 |
| Resistor R24 | 2 Megohms |
| Resistor R25 | 10,000 ohms P.T.C. |
| Capacitor C9 | 2 mf |

(Further description of this type of overcurrent protection circuit may be had by reference to the mentioned copending application of Mitchell and Billings, and also to the copending application S.N. 337,969 of Shuey and Baker. Circuit 48 does not have direct connection with D.C. bus 36 but instead gets power by way of elements shown in control logic circuit 38.)

Zero Crossover Circuit 50

| | |
|---|---|
| Resistor R26 | 500,000 ohms |
| Diode D9 | 1N649 |
| Diode D10 | 1N914 |
| Diode D11 | 12 V. Zener |
| Capacitor C10 | 0.047 mf., 50 V. |
| Resistor R27 | 250,000 ohms |
| Logic Gates G5, G6, G7 and G8 | CMOS type RCA/CD 4011 Quad NAND |
| Resistor R29 | 200,000 ohms |
| Resistor R30 | 50,000 ohms |
| Capacitor C11 | 250 pf. |

(Further description of this type of zero crossover circuit may be had by reference to the mentioned copending application of Billings and Tipton. Circuit 50 gets its DC power off of bus 63.)

DC Control Circuit 52

| | |
|---|---|
| Input control signal 85 | 6 V. DC, 10 ma. maximum |
| Resistor R32 | 600 ohms |
| Diode D12 | 12 V. Zener |
| Resistor R33 | 3,000–5,000 ohms, Adjustable |
| Resistor R35 | 10,000 ohms |
| Diode D13 | 1N914 |
| Transistors Q10 and Q11 | 2N2219A |
| Capacitor C13 | 0.047 mf., 25 V. |
| Resistors R36 and R37 | 2,000 ohms |
| Resistor R38 | 50,000 ohms |
| Resistor R39 | 10,000 ohms |
| Diode D14 | 2.4 V. Zener |
| Resistor R40 | 100 ohms |
| Transistor Q12 | 2N2904 |
| Optically Coupled Diode Unit OC2 | MCD2 |

(Circuit 52 can be generally characterized as including a differential amplifier having one input which is proportional to the control signal and another which is a reference level developed from the control signal. An output to OC2 occurs only when the control signal exceeds a threshold level.)

The circuit of FIG. 3 is a presently preferred embodiment of the invention as has been successfully made and operated. The foregoing description will convey an understanding of the salient features of the invention and their operation without limiting the scope of invention to the exact form shown because numerous modifications in detail can be made.

Since only a single DC power bus 36 is required the power supply is devised, preferably, in a transformerless configuration, although alternatively it could be provided with a smaller transformer than previously required. The transformerless configuration shown and preferred is one that can be referred to as a capacitor voltage divider power supply and can be provided with considerable ease and compactness compared with transformer configuration. In this type of circuit, the two capacitors C3 and C4 divide the AC voltage to a desired level in a manner similar to that in which an autotransformer divides AC voltage. The rectifier comprising diodes D4 then provides full wave rectification to the desired portion which is then filtered by C5 processed to a 30 V. nominal voltage.

What is claimed is:

1. A power controller for controlling the supply of power from an AC supply to a load and comprising:

a switch having supply and load terminals and also having at least one drive terminal at which the selective application of predetermined drive signal alters the conductivity of said switch;

a drive circuit for applying drive signals to said switch and having at least one output terminal electrically coupled, respectively, to said at least one drive terminal of said switch, said drive circuit having a control input terminal and a power input terminal;

a power supply circuit having input terminals for connection to the AC supply and an output terminal connected to said power input terminal of said drive circuit, said power supply circuit comprising elements for the conversion of AC power to DC power on a single power bus;

a control logic circuit having an output terminal connected to said control input terminal of said drive circuit and a power input terminal connected to said output terminal of said power supply circuit;

at least one control and protection circuit having at least one output signal terminal connected to said control logic circuit and having at least one input signal terminal connected to the AC supply, said at least one control and protection circuit being operative without energization from any DC power supply separate from that of said power supply circuit.

2. The subject matter of claim 1 wherein said at least one control and protection circuit includes an overcurrent protection circuit for providing signals ultimately to control the conduction of said switch so the load is not subjected to damaging overcurrent.

3. The subject matter of claim 1 wherein said at least one control and protection circuit includes a zero crossover circuit for providing signals ultimately to control the conduction of said switch in desired relation to zero crossovers of the waveform of the AC supply.

4. The subject matter of claim 1 wherein said power supply circuit comprises a capacitor voltage divider power supply.

5. The subject matter of claim 1 wherein said power supply circuit is a transformerless power supply.

6. The subject matter of claim 4 wherein: said capacitor-voltage divider power supply comprises a pair of capacitors serially connected across said input terminals, and a full wave rectifier connected to rectify the voltage across one of said capacitors.

* * * * *